Patented Feb. 24, 1942

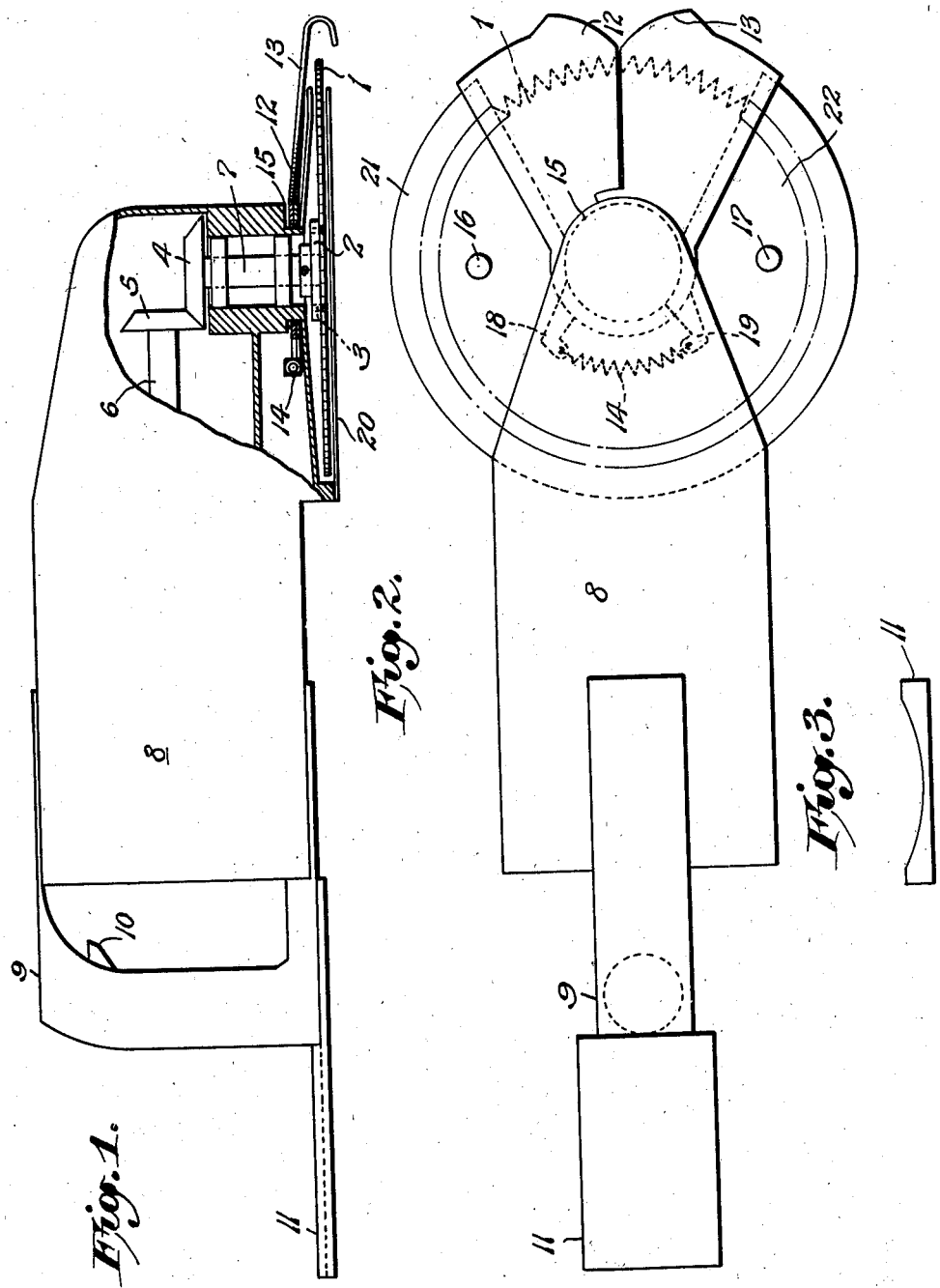

2,274,421

UNITED STATES PATENT OFFICE 2,274,421

POWER DRIVEN PRUNING DEVICE

Linn Olaf B. Lindstrom and Alvero E. Smith, San Francisco, Calif.

Application November 21, 1939, Serial No. 305,466

1 Claim. (Cl. 30—67)

This invention relates to a tree or bush pruning device in which the plane of the pruning saw is parallel to a horizontal plane through the center of the shaft of the driving motor which can be either an electric motor or an air motor or turbine or a steam turbine, the assembly being such that the device can be applied to the branch to be cut with full visibility of the work being performed and this form of pruning device allows insertion of the device through small openings between branches with minimum interference. This invention also makes it possible to prune closer to the branch or trunk being pruned which is essential in many types of fruit tree pruning. The device can be used with a short handle or at the end of a long handle when operating from the ground.

Safety provisions for protecting the operator against cuts are included as a part of this invention.

As an example of our invention we will describe our preferred construction of apparatus, as illustrated on the annexed drawing.

Figure 1 is a side view of the device, showing how the pruning saw shaft is at right angles to the motor driving shaft, Figure 2 is a top view of the complete device and Figure 3 is an end view of the wrist and arm rest attachment.

The circular saw 1 is fastened to the arbor 2 by suitable means such as the screws 3 so that there is no projection of the shaft 7 beyond the face of the saw 1, to allow very close pruning.

Power is transmitted through the bevel gears or cones 4 and 5 from the shaft 6 of motor 8.

Operating handle 9 with operating trigger 10 is detachable from motor 8. The wrist and arm rest 11 is detachable from handle 9.

The saw guard shields 12 and 13 are held together by the spring 14, the shields being rotatable about the circular inset support 15 in such a way that when a branch enters between the curved faces of the shields 12 and 13, the pressure opens the guard against the tension of spring 14.

Stops 16 and 17 limit the travel of the guard shields 12 and 13. The shields 12 and 13 butt up against each other where the shields come together on a line out from the center of the saw but rest one above the other in the inset support 15. The spring 14 on the guard shields is fastened to the ears 18 and 19 of the shields 12 and 13.

The lower face 20 and the upper face 21 of the saw guard are stationary and fitted very close to the saw 1. The notch 22 in the lower and upper stationary guard faces is where the branch is cut.

What we claim as new and patentable is:

In a power pruning device the combination of a circular saw and driving motor, where the motor and saw head are connected together in a complete assembly for operation as one unit, where the driving shaft of the saw is at a right angle to the driving motor shaft, and the plane of the saw perpendicular to any plane thru the axis of the operating handle, gearing between the motor shaft and the saw shaft, support bearings on the saw shaft on the motor side of the saw only, a housing supporting the saw shaft bearings, saw shaft, motor, motor shaft and bearings, driving gears, in one compact assembly, with an operating handle secured to such assembly, a face plate secured to the saw shaft, the saw secured to such face plate with screws whose heads are inset flush with the outside face of the saw, a stationary guard consisting of a lower face that is a flat piece with a notch cut out but with no projections and fitted close to the face of the saw with minimum operating clearance, an upper stationary guard face with notch, a movable guard portion consisting of an upper set of faces only with edges curled down and over the operating perimeter of the saw teeth only such movable guard faces being rotatable about a circular machined surface inset in the housing around the saw shaft bearings and gearing.

LINN OLAF B. LINDSTROM.
ALVERO E. SMITH.